United States Patent
Kang et al.

(10) Patent No.: US 11,084,129 B2
(45) Date of Patent: Aug. 10, 2021

(54) DEVICE AND METHOD OF CUTTING POLARIZING PLATE

(71) Applicant: Samsung Display Co., Ltd., Yongin-si (KR)

(72) Inventors: Kuhyun Kang, Yongin-si (KR); Ilyoung Jeong, Yongin-si (KR); Gyoowan Han, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 602 days.

(21) Appl. No.: 15/828,241

(22) Filed: Nov. 30, 2017

(65) Prior Publication Data

US 2018/0154486 A1      Jun. 7, 2018

(30) Foreign Application Priority Data

Dec. 5, 2016   (KR) .......................... 10-2016-0164385

(51) Int. Cl.
| | |
|---|---|
| *B23K 26/06* | (2014.01) |
| *B23K 26/38* | (2014.01) |
| *B23K 26/082* | (2014.01) |
| *B23K 26/0622* | (2014.01) |
| *G02B 5/30* | (2006.01) |
| *B23K 103/00* | (2006.01) |

(52) U.S. Cl.
CPC .......... *B23K 26/38* (2013.01); *B23K 26/0622* (2015.10); *B23K 26/0648* (2013.01); *B23K 26/082* (2015.10); *B23K 2103/42* (2018.08); *G02B 5/30* (2013.01)

(58) Field of Classification Search
CPC ............... B23K 2103/42; B23K 26/38; B23K 26/0622; B23K 26/082; B23K 26/0648
USPC .... 219/121.6, 121.68, 121.7, 121.71, 121.72
See application file for complete search history.

(56) References Cited

U.S. PATENT DOCUMENTS

| | | | | |
|---|---|---|---|---|
| 5,760,366 | A * | 6/1998 | Haruta | ..................... C23C 14/22 219/121.68 |
| 7,397,831 | B2 * | 7/2008 | Hongo | ............... B23K 26/0738 372/38.02 |

(Continued)

FOREIGN PATENT DOCUMENTS

| | | |
|---|---|---|
| JP | 3395141 B2 | 2/2003 |
| JP | 2015-214771 A | 12/2015 |

(Continued)

*Primary Examiner* — Charles P. Cheyney
(74) *Attorney, Agent, or Firm* — Lewis Roca Rothgerber Christie LLP

(57) ABSTRACT

A polarizing plate-cutting device including a laser beam generator configured to emit a laser beam, a scanner including a rotating mirror configured to reflect the laser beam emitted from the laser beam generator, and a housing accommodating the rotating mirror, a condenser lens configured to condense the laser beam reflected from the rotating mirror, and a mounting block onto which the laser beam condensed by the condenser lens is irradiated and to which a polarizing plate is mounted, wherein the mounting block is fixed with respect to the scanner while the polarizing plate is being cut, and wherein the polarizing plate includes a stacking of a base substrate and a polarizing layer, the base substrate being closer to the condenser lens than the polarizing layer, and a heat resistance of the polarizing layer being lower than that of the base substrate.

5 Claims, 2 Drawing Sheets

(56) References Cited

U.S. PATENT DOCUMENTS

| | | | | |
|---|---|---|---|---|
| 8,486,073 B2 * | 7/2013 | Lappalainen | ....... | A61F 2/30767 |
| | | | | 606/76 |
| 2011/0003114 A1 * | 1/2011 | Nakamura | ........... | H05K 3/0032 |
| | | | | 428/131 |
| 2015/0231738 A1 * | 8/2015 | Ota | ....................... | B23K 26/382 |
| | | | | 219/121.71 |
| 2016/0299271 A1 * | 10/2016 | Lee | ....................... | B23K 26/402 |

FOREIGN PATENT DOCUMENTS

| | | |
|---|---|---|
| KR | 10-2006-0089790 A | 8/2006 |
| KR | 10-2013-0119173 A | 10/2013 |
| KR | 10-2014-0043524 A | 4/2014 |
| KR | 10-2015-0033994 A | 4/2015 |
| WO | WO 2006/083067 A1 | 8/2006 |
| WO | WO 2015/046738 A1 | 4/2015 |

* cited by examiner

DEVICE AND METHOD OF CUTTING POLARIZING PLATE

CROSS-REFERENCE TO RELATED APPLICATION

This application claims priority to, and the benefit of, Korean Patent Application No. 10-2016-0164385, filed on Dec. 5, 2016, in the Korean Intellectual Property Office, the disclosure of which is incorporated herein in its entirety by reference.

BACKGROUND

1. Field

Aspects of embodiments of the present disclosure relate to a device and method of cutting a polarizing plate.

2. Description of the Related Art

A polarizing plate usually includes a polarizing element made of a polyvinyl alcohol (hereinafter, referred to as "PVA") resin that is stretched by impregnation with a dichroic dye or iodine, and may have a multilayer structure in which an optical film is stacked on one surface or both surfaces of the polarizing element using an adhesive or the like, an adhesive layer and a release film are stacked on one surface of the optical film, and a protective film is stacked on the other surface of the optical film.

In order to apply such a polarizing plate to a display device or the like, the polarizing plate is cut to a certain size. Polarizing plate cutting may be actively performed using a laser beam. However, when excessive heat is applied to the polarizing plate, defects such as a change in color of the polarizing plate may occur.

SUMMARY

Aspects of one or more example embodiments are directed to a device and a method of cutting a polarizing plate with a laser beam in which no defects are generated in the cut polarizing plate.

Additional aspects will be set forth in part in the description which follows and, in part, will be apparent from the description, or may be learned by practice of the presented example embodiments.

According to one or more example embodiments, there is provided a polarizing plate-cutting device including: a laser beam generator configured to emit a laser beam; a scanner including a rotating mirror configured to reflect the laser beam emitted from the laser beam generator, and a housing accommodating the rotating mirror; a condenser lens configured to condense the laser beam reflected from the rotating mirror; and a mounting block onto which the laser beam condensed by the condenser lens is irradiated and to which a polarizing plate is mounted, wherein the mounting block is fixed with respect to the scanner while the polarizing plate is being cut, and wherein the polarizing plate includes a stacking of a base substrate and a polarizing layer, the base substrate being closer to the condenser lens than the polarizing layer, and a heat resistance of the polarizing layer being lower than that of the base substrate.

In an embodiment, the laser beam generator is configured to sequentially emit a first laser beam having a first optical power and a second laser beam having a second optical power, the second optical power being less than the first optical power.

In an embodiment, the laser beam generator is configured to cut the base substrate via the first laser beam, and the laser beam generator is configured to cut the polarizing layer via the second laser beam.

In an embodiment, a pulse repetition frequency (PRF) of the first and second laser beams is about 1 MHz to about 5 MHz.

In an embodiment, the housing is fixed in position while the laser beam is emitted, and the scanner is configured to irradiate the laser beam onto the polarizing plate at a scanning speed of 3 m/sec to 6 m/sec by rotation of the rotating mirror.

In an embodiment, the condenser lens is an F-theta lens having a focal length of 150 mm to 300 mm.

According to one or more example embodiments, there is provided a method of cutting a polarizing plate including a stacking of a base substrate and a polarizing layer, the method including: irradiating a first laser beam having a first optical power in a direction from the base substrate to the polarizing layer 120 to cut the base substrate; and cutting the polarizing layer by irradiating a second laser beam having a second optical power in the direction after the base substrate is cut, the second optical power being less than the first optical power, wherein a heat resistance of the base substrate is higher than that of the polarizing layer.

In an embodiment, a pulse repetition frequency (PRF) of the first and second laser beams is about 1 MHz to about 5 MHz.

In an embodiment, a scanning speed at which the first laser beam is irradiated along a cutting line of the base substrate is 3 m/sec to 6 m/sec, and a scanning speed at which the second laser beam is irradiated along a cutting line of the polarizing layer is 3 m/sec to 6 m/sec.

In an embodiment, the base substrate includes a stacking of a polyethylene terephthalate (PET) film and a polyimide (PI) film.

In an embodiment, the polarizing layer includes polyvinyl alcohol (PVA).

In an embodiment, the cutting of the polarizing layer is performed by a polarizing plate-cutting device including: a laser beam generator configured to emit a laser beam; a scanner including a rotating mirror configured to reflect the laser beam emitted from the laser beam generator, and a housing accommodating the rotating mirror; a condenser lens configured to condense the laser beam reflected from the rotating mirror; and a mounting block onto which the laser beam condensed by the condenser lens is irradiated and to which a polarizing plate is mounted, wherein the mounting block is fixed with respect to the scanner while the polarizing plate is being cut.

BRIEF DESCRIPTION OF THE DRAWINGS

These and/or other aspects will become apparent and more readily appreciated from the following description of the example embodiments, taken in conjunction with the accompanying drawings in which.

DETAILED DESCRIPTION

Figure 1:
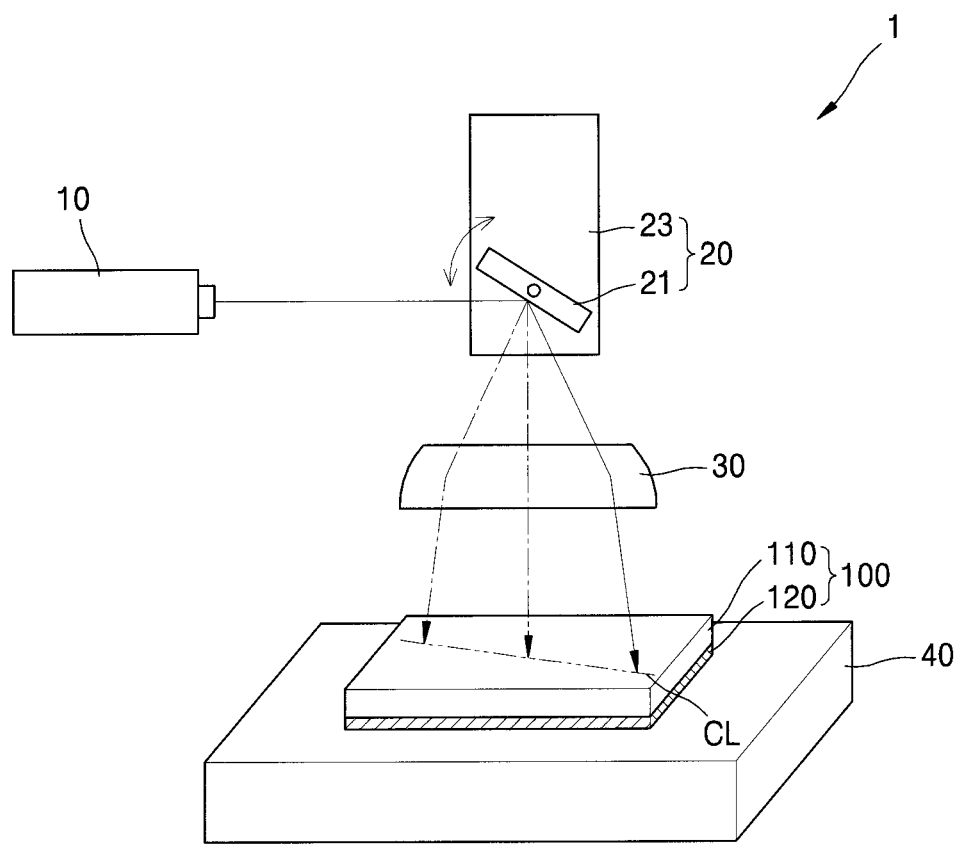
FIG. 1 is a view of a polarizing plate-cutting device according to an example embodiment of the present disclosure.

Reference will now be made in detail to example embodiments, examples of which are illustrated in the accompanying drawings, wherein like reference numerals refer to like elements throughout. In this regard, the present example embodiments may have different forms and should not be construed as being limited to the descriptions set forth herein. Accordingly, the example embodiments are merely described below, by referring to the figures, to explain aspects of the present description.

Hereinafter, the present disclosure will be described in detail with reference to the accompanying drawings.

FIG. 1 is a schematic view of a polarizing plate-cutting device 1 according to an example embodiment of the present disclosure.

Referring to FIG. 1, the polarizing plate-cutting device 1 according to an example embodiment includes a laser beam generator 10 for emitting a laser beam, a scanner 20 including a rotating mirror 21 for reflecting the laser beam emitted from the laser beam generator 10 and a housing 23 equipped with the rotating mirror 21, a condenser lens 30 for condensing the laser beam reflected from the rotating mirror 21, and a mounting unit (e.g., a mounting block) 40 onto which the laser beam condensed by the condenser lens 30 is irradiated and on which a polarizing plate 100 is mounted. The mounting unit 40 may be fixed with respect to the scanner 20 while the polarizing plate 100 is being cut.

The laser beam generator 10 emits a laser beam, and may further include a light source from which a laser beam is emitted, a beam expander for expanding a size of the laser beam emitted from the light source, and/or a reflecting mirror for adjusting an optical path.

The laser beam emitted from the laser beam generator 10 is incident on the scanner 20. The scanner 20 includes the rotating mirror 21 reflecting the laser beam and the housing 23 over which the rotating mirror 21 is mounted. The scanner 20 may further include a driver for rotating the rotating mirror 21 and an optical system for adjusting an optical path. The driver may include an actuator, which may be implemented using any one of a galvanometer, a servo motor, and a stepping motor depending on the application.

The condenser lens 30 may be a lens for condensing the laser beam reflected by the rotating mirror 21. The condenser lens 30 may be an F-theta lens having a focal length of about 200 mm to about 300 mm. The F-theta lens is a focusing lens, and has a characteristic that focus is formed at an identical plane regardless of incident angles of laser beams incident on the F-theta lens. Accordingly, by using the F-theta lens having a focal length of about 200 mm to about 300 mm, the polarizing plate 100 may be cut at a constant optical power regardless of a position where the polarizing plate 100 is cut.

The mounting unit 40 is a portion to which the polarizing plate 100 to be cut is mounted and fixed. The mounting unit 40 is fixed with respect to the scanner 20 while the polarizing plate 100 is being cut. Furthermore, the polarizing plate 100 including a base substrate 110 and a polarizing layer 120 is mounted over the mounting unit 40 so that the base substrate 110 may be mounted facing the condenser lens 30.

In an example embodiment, the scanner 20 is fixed with respect to the laser beam generator 10 and the mounting unit 40 while the polarizing plate 100 is being cut. That is, the housing 23 of the scanner 20 is fixed with respect to the laser beam generator 10 and the mounting unit 40 while the polarizing plate 100 is being cut, and a position of a laser beam is adjusted by rotation of the rotating mirror 21 in the scanner 20. The laser beam whose position is adjusted by the rotating mirror 21 cuts the polarizing plate 100 while scanning the polarizing plate 100 along a cutting line of the polarizing plate 100.

If the mounting unit 40 or the scanner 20 moves along the cutting line of the polarizing plate 100, the speed of the mounting unit 40 or the scanner 20 is limited to 500 mm/s or less so that a superposition ratio of laser beams is increased. Thus, a heat affected zone (HAZ) due to thermal deformation may be enlarged.

In an example embodiment, a scanning speed of a laser beam is adjusted by fixing the mounting unit 40 and the housing 23 of the scanner 20 and rotating the rotating mirror 21 in the scanner 20 so that the speed may be increased to about 3 m/sec to about 6 m/sec. As a result, the superposition ratio of laser beams is lowered and thermal deformation may be reduced when the polarizing plate 100 is cut. Here, the scanning speed of a laser beam may denote the speed at which the laser beam moves along a cutting line CL.

A pulse repetition frequency (PRF) of a laser beam generated by the laser beam generator 10 may be several MHz. As a scanning speed of the laser beam is improved (e.g., increased), a superposition ratio of the laser beam is lower even though the PRF of the laser beam is increased to several MHz, and thus, thermal deformation may be reduced and process time may be shortened as the PRF is increased. In some example embodiments, the PRF of the laser beam may be about 1 MHz to about 5 MHz.

The laser beam generator 10 may sequentially generate first and second laser beams respectively having different optical powers to cut the polarizing plate 100. In the present disclosure, the laser beam generator 10 may generate the first and second laser beams respectively having different optical powers, and the polarizing plate 100 in which materials with different heat resistances are stacked may be cut in two operations. However, the present disclosure is not limited thereto. For example, it is also possible to cut the polarizing plate 100 in three or more operations with three or more different optical powers of the laser beam.

In an example embodiment, the polarizing plate 100 may be stacked including the base substrate 110 and the polarizing layer 120, and a heat resistance of the polarizing layer 120 may be lower than that of the base substrate 110. In this case, the laser beam generator 10 may generate a first laser beam having a first power (e.g., first optical power) to first cut the base substrate 110, and may generate a second laser beam having a second power to cut the polarizing layer 120, the second power being less than the first power (e.g., first optical power). In some example embodiments, intensity of the first power may be about 15 $J/cm^2$ to about 20 $J/cm^2$, and intensity of the second power may be about 3 $J/cm^2$ to about 7 $J/cm^2$.

When the polarizing plate 100 is stacked including materials with different heat resistances, a method of cutting the polarizing plate 100 by setting the optical power of a laser beam to correspond to a material with a lower heat resistance may be assumed. However, when the polarizing plate 100 is cut with a laser beam having less power corresponding to the material with a lower heat resistance, there is a problem that processing time increases. On the other hand, if power of the laser beam is increased in order to reduce the process time, the material with a lower heat resistance may be damaged by heat.

In the present example embodiment, the polarizing plate 100 is cut by adjusting power of a laser beam corresponding to materials with different heat resistances, so that damage due to heat of the polarizing plate 100 may be reduced or minimized and processing time may be shortened.

Figure 2:
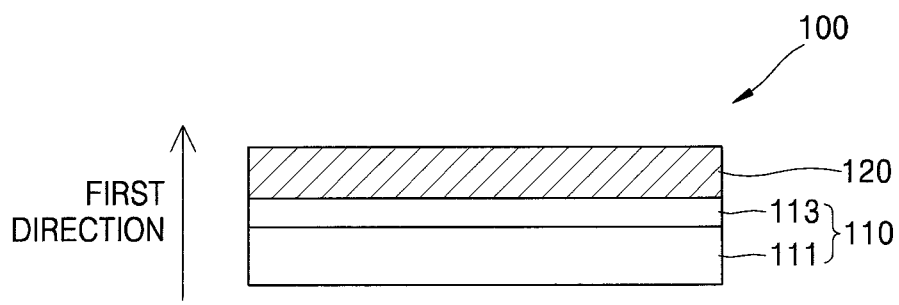
FIG. 2 is a cross-sectional view of a polarizing plate which may be applied to an example embodiment of the present disclosure.

FIG. 2 is a schematic cross-sectional view of the polarizing plate 100, which can be cut according to an example embodiment of the present disclosure.

The polarizing plate 100 has a structure in which the base substrate 110 and the polarizing layer 120 are stacked. The base substrate 110 supports the polarizing layer 120 and has a higher heat resistance than that of the polarizing layer 120. The base substrate 110 may include a single layer or a plurality of layers with similar heat resistances. For example, as illustrated in FIG. 2, the base substrate 110 may include a first layer 111, which is a polyethylene terephthalate (PET) film, and a second layer 113, which is a polyimide (PI) film. As described above, when the base substrate 110 includes a plurality of layers, outside air that can permeate the polarizing layer 120 may be blocked more efficiently.

The polarizing layer 120 polarizes light incident from a light source into light in the same direction as a polarization axis. In some example embodiments, the polarizing layer 120 may include a polyvinyl alcohol (PVA) film including a polarizer and/or a dichroic dye. The dichroic dye may include iodine molecules and/or dye molecules.

In some example embodiments, the polarizing layer 120 may be formed by stretching a PVA film in one direction and immersing the PVA film in a solution of iodine and/or a dichroic dye. Here, iodine molecules and/or dichroic dye molecules are arranged in parallel in a stretching direction of the PVA film. Because the iodine molecules and dye molecules are dichroic, they absorb light that oscillates in the stretching direction and may transmit light that oscillates (e.g., is polarized) in a direction perpendicular or thereto.

A variety of functional layers may be disposed above and/or below the polarizing layer 120 to prevent or substantially prevent penetration of outside air, such as moisture, into the polarizing layer 120 or to supplement mechanical strength. The functional layers may include PVA, polyvinylidene chloride (PVDC), ethylene vinyl alcohol (EVOH), any one of a cycloolefin polymer (COP) and triacetyl cellulose (TAC), and/or the like. The functional layer may include a plurality of layers. The functional layer and the polarizing layer 120 may adhere to each other via an adhesive member.

The heat resistance of the polarizing layer 120 is lower than that of the base substrate 110. Accordingly, if the polarizing layer 120 is cut with power of a laser beam for cutting the base substrate 110, heat discoloration may occur. Furthermore, even if the power of the laser beam is less than the power of a laser beam for cutting the base substrate 110 when the polarizing plate 100 is cut from the top of the polarizing layer 120 to the bottom of the base substrate 110, heat may accumulate in the polarizing layer 120 and heat discoloration may occur.

Figure 3:
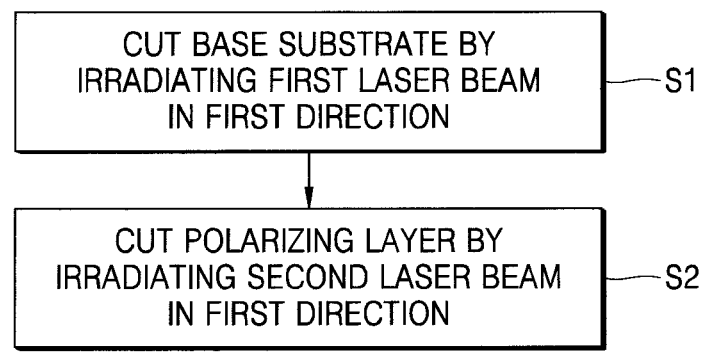
FIG. 3 is a flow diagram of a polarizing plate-cutting method according to an example embodiment of the present disclosure.

FIG. 3 is a flow diagram of a polarizing plate-cutting method for reducing or minimizing the heat discoloration and thermal deformation of the polarizing layer 120.

First, in operation S1, the base substrate 110 is cut by irradiating a first laser beam having a first power in a first direction (see FIG. 2), which is a direction from the base substrate 110 to the polarizing layer 120. Here, the first direction is perpendicular to one surface of the polarizer 100, but is not limited thereto. For example, the first direction may be a direction forming an angle of 45 to 90 degrees with one surface of the polarizing plate 100, and various modifications are possible.

Here, a heat resistance of the base substrate 110 is higher than that of the polarizing layer 120. The high heat resistance of the base substrate 110 may mean that a degree of thermal deformation of the base substrate 110 is small even if heat is applied by a laser beam.

In an example embodiment, because the base substrate 110 is cut before the polarizing layer 120, the polarizing layer 120 is less exposed to heat by a laser beam, and thus heat may not accumulate in the polarizing layer 120.

Next, after the base substrate 110 is cut, in operation S2, the polarizing layer 120 is cut by irradiating a second laser beam having a second power in the first direction (see FIG. 2), which is the direction from the base substrate 110 to the polarizing layer 120, the second power being less than the first power.

Intensity of the first power and intensity of the second power may be set considering the heat resistance of the base substrate 110 and the heat resistance of the polarizing layer 120. In some example embodiments, the intensity of the first power may be about 15 $J/cm^2$ to about 20 $J/cm^2$, and the intensity of the second power may be about 3 $J/cm^2$ to about 7 $J/cm^2$.

Each PRF of the first and second laser beams may be several MHz. As a scanning speed of a laser beam is improved (e.g., increased), a superposition ratio of the laser beam is lower even though a PRF of the laser beam is increased to several MHz, and thus, thermal deformation may be reduced and process time may be shortened as the PRF is increased. In some example embodiments, the PRF of the laser beam may be about 1 MHz to about 5 MHz.

Furthermore, a scanning speed of the first and second laser beams along the cutting line CL (see FIG. 1) of the polarizer 100 may be about 3 m/sec to about 6 m/sec. The polarizing plate-cutting device 1 illustrated in FIG. 1 may achieve such high-speed scanning. However, an example embodiment is not limited thereto. For example, any suitable cutting device capable of high-speed scanning may be utilized.

As described above, in an example embodiment, a laser beam cuts the base substrate 110 from the polarizing plate 100, and uses a device capable of scanning at high speed with a laser beam, such as the polarizing plate-cutting device 1, for the cutting by changing a condition of the laser beam for cutting the base substrate 110 and the polarizing layer 120, and thus it is possible to reduce or minimize heat discoloration and thermal deformation of the polarizing layer 120 and shorten processing time.

Below is a table of processing time and a heat affected zone (HAZ) according to Examples 1 and 2 and a Comparative Example from the related art. Here, the HAZ is a numerical value indicating a depth of a zone deformed by heat based on a cut surface of the polarizing plate 100.

In Example 1, power intensity of a first laser beam was about 17.5 $J/cm^2$, power intensity of a second laser beam was about 4.0 $J/cm^2$, and a scanning speed of the first and second laser beams was about 0.3 m/s.

In Example 2, power intensity of a first laser beam is about 17.5 $J/cm^2$, power intensity of a second laser beam is about 6.4 $J/cm^2$, and a scanning speed of the first and second laser beams is about 4 m/s.

In the Comparative Example, the polarizing plate 100 was cut with a laser beam having a power intensity of about 6.4 J/cm$^2$. Furthermore, a scanning speed of the laser beam was about 0.3 m/s.

TABLE 1

|  | processing time (sec) | HAZ (um) |
| --- | --- | --- |
| Example 1 | 7.4 | 66 |
| Example 2 | 6.8 | 28 |
| Comparative Example | 16.6 | 78 |

As shown in Table 1, it can be seen that Examples 1 and 2, in which the laser beam has two different power levels, exhibit a remarkable effect where processing time is reduced to a half or less of the Comparative Example in which power of a laser beam has one level. Furthermore, it can be seen that HAZs in Examples 1 and 2 are less than that in the Comparative Example.

It can be seen that Example 1, in which the polarizing plate 100 was cut by a laser beam at a high speed of about 4 m/s, has a remarkable effect where the HAZ was reduced to a half or less of Example 2 and the Comparative Example in which the polarizing plate 100 was cut by a laser beam at a low speed of about 0.3 m/s.

According to an example embodiment as described above, a polarizing plate-cutting device may prevent or substantially prevent damage to the polarizing plate due to heat accumulation because an optical path can be changed by rotating a mirror in a scanner and the polarizing plate can be cut at a high scan speed. Furthermore, because power of a laser beam has a plurality of levels and a plurality of operations are used to cut the polarizing plate, it is possible to shorten processing time while minimizing or reducing thermal damage.

It should be understood that example embodiments described herein should be considered in a descriptive sense and not for purposes of limitation. Descriptions of features or aspects within each example embodiment should typically be considered as available for other similar features or aspects in other example embodiments.

It will be understood that, although the terms "first", "second", "third", etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section discussed below could be termed a second element, component, region, layer or section, without departing from the spirit and scope of the inventive concept.

Spatially relative terms, such as "beneath", "below", "lower", "under", "above", "upper" and the like, may be used herein for ease of description to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly. In addition, it will also be understood that when a layer is referred to as being "between" two layers, it can be the only layer between the two layers, or one or more intervening layers may also be present.

The terminology used herein is for the purpose of describing particular embodiments and is not intended to be limiting of the inventive concept. As used herein, the singular forms "a" and "an" are intended to include the plural forms as well, unless the context clearly indicates otherwise. It will be further understood that the terms "include," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Further, the use of "may" when describing embodiments of the inventive concept refers to "one or more embodiments of the inventive concept." Also, the term "exemplary" is intended to refer to an example or illustration.

It will be understood that when an element or layer is referred to as being "on", "connected to", "coupled to", or "adjacent" another element or layer, it can be directly on, connected to, coupled to, or adjacent the other element or layer, or one or more intervening elements or layers may be present. When an element or layer is referred to as being "directly on," "directly connected to", "directly coupled to", or "immediately adjacent" another element or layer, there are no intervening elements or layers present.

As used herein, the term "substantially," "about," and similar terms are used as terms of approximation and not as terms of degree, and are intended to account for the inherent variations in measured or calculated values that would be recognized by those of ordinary skill in the art. Further, a specific quantity or range recited in this written description or the claims may also encompass the inherent variations in measured or calculated values that would be recognized by those of ordinary skill in the art.

As used herein, the terms "use," "using," and "used" may be considered synonymous with the terms "utilize," "utilizing," and "utilized," respectively.

Also, any numerical range recited herein is intended to include all subranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein. All such ranges are intended to be inherently described in this specification.

The polarizing plate-cutting device and/or any other relevant devices or components, such as parts of the laser beam generator and scanner, according to embodiments of the present invention described herein may be implemented utilizing any suitable hardware, firmware (e.g. an application-specific integrated circuit), software, or a suitable combination of software, firmware, and hardware. For example, the various components of the polarizing plate-cutting device may be formed on one integrated circuit (IC) chip or on separate IC chips. Further, the various components of the polarizing plate-cutting device may be implemented on a flexible printed circuit film, a tape carrier package (TCP), a printed circuit board (PCB), or formed on a same substrate. Further, the various components of the polarizing plate-cutting device may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the scope of the exemplary embodiments of the present invention.

Sizes of components in the drawings may be exaggerated for convenience of explanation. In other words, since sizes and thicknesses of components in the drawings are arbitrarily illustrated for convenience of explanation, the following embodiments are not limited thereto.

When a certain embodiment may be implemented differently, a specific process order may be performed differently from the described order. For example, two consecutively described processes may be performed substantially at the same time or performed in an order opposite to the described order.

While one or more example embodiments have been described with reference to the figures, it will be understood by those of ordinary skill in the art that various suitable changes in form and detail may be made therein without departing from the spirit and scope of the present disclosure as defined by the following claims and equivalents thereof.

What is claimed is:

1. A polarizing plate-cutting device comprising:
a laser beam generator configured to emit a laser beam;
a scanner comprising a rotating mirror configured to reflect the laser beam emitted from the laser beam generator, and a housing accommodating the rotating mirror;
a condenser lens configured to condense the laser beam reflected from the rotating mirror; and
a mounting block onto which the laser beam condensed by the condenser lens is irradiated and to which a polarizing plate is mounted,
wherein the mounting block is fixed with respect to the scanner while the polarizing plate is being cut,
wherein the polarizing plate comprises a stacking of a base substrate and a polarizing layer, the base substrate being closer to the condenser lens than the polarizing layer, and a heat resistance of the polarizing layer being lower than that of the base substrate,
wherein the laser beam generator is configured to sequentially emit a first laser beam having a first optical power to cut through the base substrate and a second laser beam having a second optical power to cut the polarizing layer after cutting through the base substrate, the second optical power being less than the first optical power, and
wherein an intensity of the first optical power is 15 $J/cm^2$ to 20 $J/cm^2$ and an intensity of the second optical power is 3 $J/cm^2$ to about 7 $J/cm^2$.

2. The polarizing plate-cutting device of claim 1,
wherein the laser beam generator is configured to cut the base substrate via the first laser beam, and
wherein the laser beam generator is configured to cut the polarizing layer via the second laser beam.

3. The polarizing plate-cutting device of claim 1,
wherein a pulse repetition frequency (PRF) of the first and second laser beams is about 1 MHz to about 5 MHz.

4. The polarizing plate-cutting device of claim 1,
wherein the housing is fixed in position while the laser beam is emitted, and
wherein the scanner is configured to irradiate the laser beam onto the polarizing plate at a scanning speed of 3 m/sec to 6 m/sec by rotation of the rotating mirror.

5. The polarizing plate-cutting device of claim 1,
wherein the condenser lens is an F-theta lens having a focal length of 150 mm to 300 mm.

* * * * *